United States Patent [19]

Vincent et al.

[11] 3,766,429

[45] Oct. 16, 1973

[54] COLOR TV FOCUSING CIRCUIT

[75] Inventors: Jean Gabriel Vincent, Bagneux; Claude Gabriel Jean Thevenin, Nanterre, both of France

[73] Assignee: International Standard Electric Corporation, New York, N.Y.

[22] Filed: Mar. 7, 1972

[21] Appl. No.: 232,367

[52] U.S. Cl........... 315/31 R, 315/13 C, 315/27 TD

[51] Int. Cl........................................... H01j 31/04

[58] Field of Search..................... 315/31 R, 31 TV, 315/22, 13 C, 13 CG, 27 TD; 313/84

[56] References Cited

UNITED STATES PATENTS

| | | | |
|---|---|---|---|
| 2,749,473 | 6/1956 | Nelson | 315/31 TV |
| 3,340,422 | 9/1967 | Bull | 315/22 |
| 2,801,363 | 7/1957 | Sonnenfeldt | 315/22 |
| 3,177,396 | 4/1965 | Brooks | 315/31 TV |

*Primary Examiner*—Carl D. Quarforth
*Assistant Examiner*—E. E. Lehmann
*Attorney*—C. Cornell Remsen, Jr. et al.

[57] ABSTRACT

A circuit for the horizontal and vertical focusing of color television receivers. Parabolic voltages derived from the corresponding deflection voltages at line and frame frequencies are separated by switches into half-parabolas. The half-parabola voltages are applied to a receiver matrix circuit which, in turn, drives the color focusing coils, one pair of coils being provided for each color.

4 Claims, 4 Drawing Figures

COLOR TV FOCUSING CIRCUIT

BACKGROUND OF THE INVENTION

This invention relates to a dynamic horizontal and vertical focusing assembly for color television tubes and more particularly to such an assembly wherein the focusing device for each color utilizes a single pair of coils.

Numerous assemblies of this type are already known, but all of them present the drawback that they provide unsatisfactory color registration at the center of the screen when the color television receiver set is being adjusted. Thus, it is necessary to provide different control systems for different standards, and this results in a substantial cost increase for focusing assemblies and difficulties in adjusting them.

Those assemblies are particularly known in which parabolic shaped voltages, derived from corresponding deflection voltages at line frequency and frame frequency, are separated by means of switches into two half-parabolas that are applied, after the necessary amplitude change, to corresponding focusing coils.

Thus, the magnetic circuit of a focusing assembly comprises two or more pairs of coils which are necessarily intercoupled. Therefore, although those pairs of coils have currents that are clamped to the picture tube center, corresponding magnetic fields providing corrections are unfortunately not clamped due to mutual induction between coil pairs. In fact, to obtain a perfect clamping of those currents it is necessary that the line parabola center and frame parabola center coincide at the center of the picture tube and have a zero amplitude.

SUMMARY OF THE INVENTION

Therefore the main object of this invention is to provide a dynamic horizontal and vertical focusing assembly for a color television picture tube in which the focusing circuit for each color utilizes a single pair of coils.

It is a feature of this invention that each focusing device is controlled by a transistor circuit, said circuit receiving adjusting voltages at the line frequency and at the frame frequency.

According to the present invention there is provided a dynamic horizontal and vertical focusing network for a color television picture tube comprising first means coupled to the horizontal deflection circuit of the television for providing first and second half-parabola signals at line frequency, second means coupled to the vertical deflection circuit of the television for providing third and fourth half-parabola signals at frame frequency, matrix means receiving said four half-parabola signals and providing first, second and third focusing signals, said first, second and third focusing signals each being proportional to the sum of said four half-parabola signals, and first, second and third focusing devices coupled to said matrix means for receiving said first, second and third focusing signals respectively for controlling the focus of the red, blue and green signals, respectively.

Further objects and features of this invention will become more apparent by reference to the following description taken in conjunction with the accompanying drawings, in which:

DESCRIPTION OF THE PREFERRED EMBODIMENT

Figure 1:
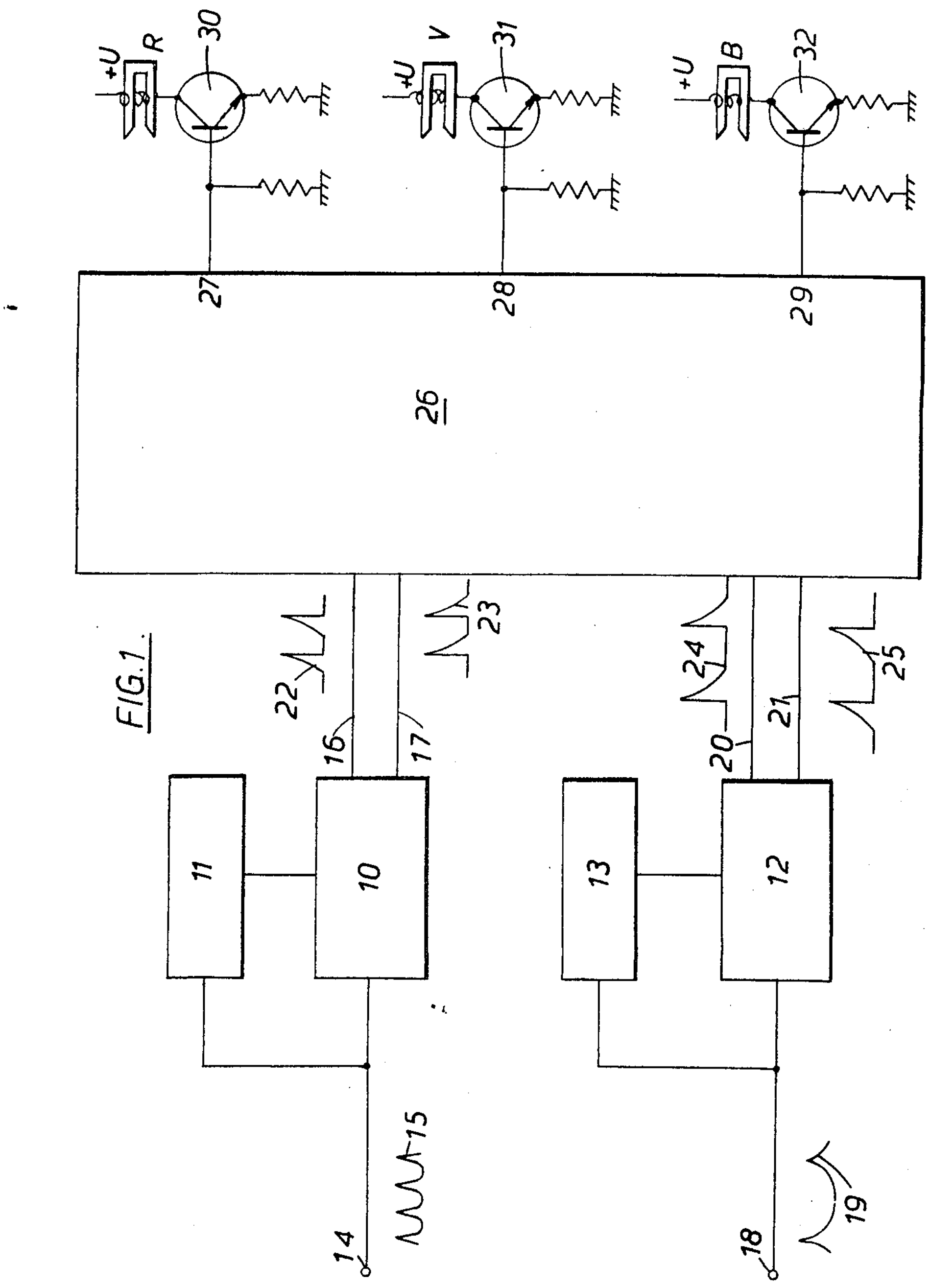
FIG. 1 is a block diagram illustrating an embodiment of this invention.

As shown in FIG. 1, the focusing assembly comprises a circuit 10 providing the two half-parabolas at the line frequency and being controlled by a switch 11. In a same manner, it comprises a circuit 12 providing the two half-parabolas at the frame frequency and being controlled by a switch 13.

Both circuit 10 and switch 11 are connected to terminal 14 of horizontal deflection circuit providing parabolic shaped voltage, as schematically shown in 15. The two half-parabolas are respectively, as shown in 22 and 23, available at outputs 16 and 17 of circuit 10.

Similarly, circuit 12 and switch 13 are connected to terminal 18 of vertical deflection circuit providing voltage at frame frequency as illustrated in 19. The two half-parabolas are respectively, as shown at 24 and 25, available at outputs 20 and 21 of circuit 12.

Outputs 16, 17, 20 and 21 supply matrix circuit 26 with signals derived from the half-parabolas at line frequency and frame frequency.

The three matrix circuit outputs 27, 28 and 29, respectively are connected to three power transistors 30, 31 and 32 which, in turn, are respectively connected to the three pairs of coils of the red (R), green (V) and blue (B) focusing devices.

According to the invention, matrix circuit 26 applies to the control electrodes of transistors 30, 31 and 32 a complex signal representing the sum of signals 22, 23, 24, and 25 that are respectively weighted in order to obtain the amplitude variations required.

Figure 2:
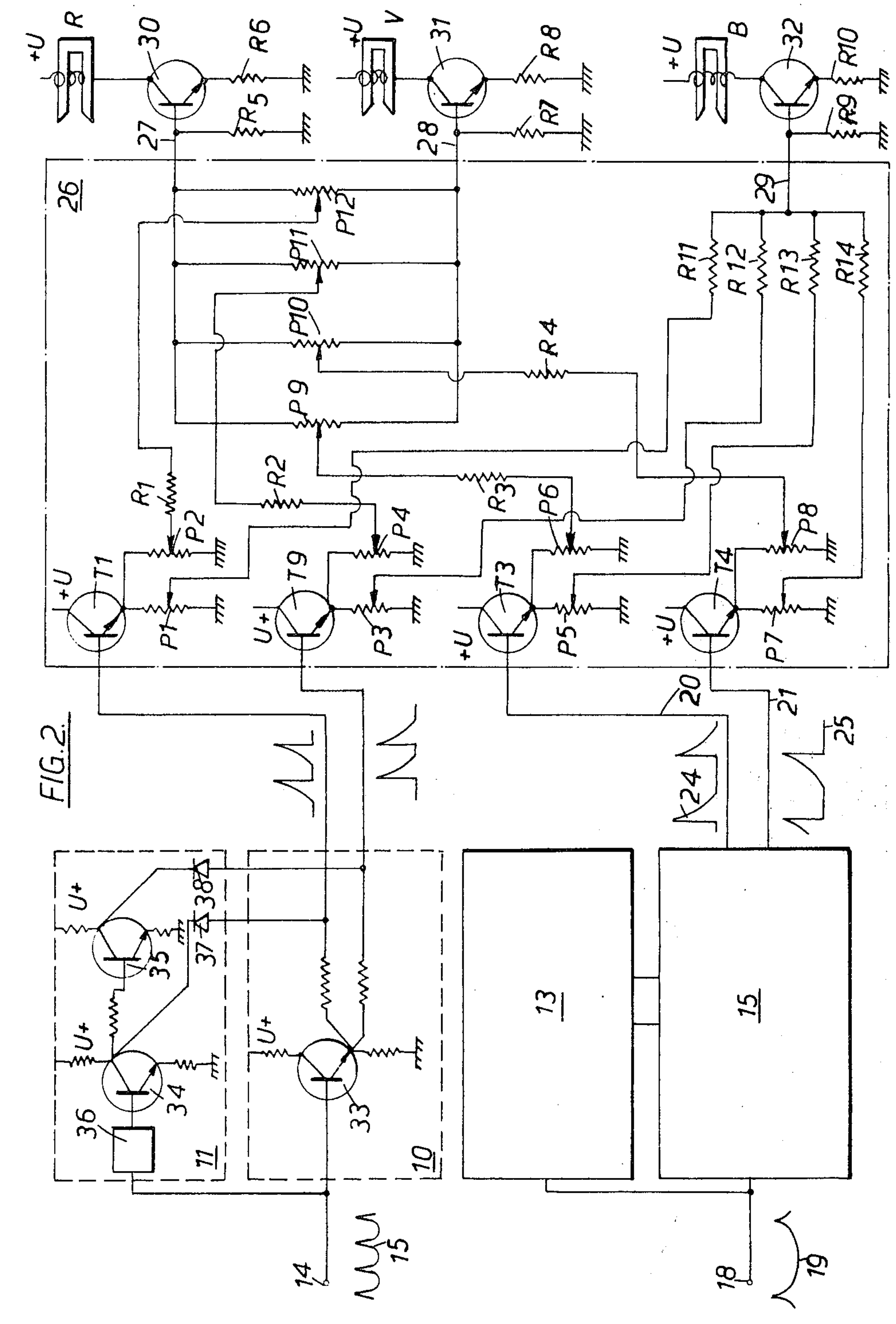
FIG. 2 is a schematic diagram illustrating details of the block diagram in FIG. 1.

A detailed embodiment of the dynamic focusing assembly according to the invention is shown in FIG. 2.

Circuit 10 comprises transistor 33 whose base is connected to terminal 14, the collector of which is biased at potential +U via a load resistor and the emitter of which is grounded via an emitter resistor. Switch 11, controlling circuit 10, comprises two transistors 34 and 35 whose emitters are grounded and whose collectors are biased via corresponding load resistors. The collector of transistor 34 is connected to the base of transistor 35 via a resistor. The base of transistor 34 is supplied by a shaping circuit 36 generating a saw-tooth voltage at line frequency. Circuit 36 is connected to terminal 14 and is quite conventional, detailed description thereof therefore not being considered necessary.

Outputs 16 and 17 of circuit 10 are connected to the emitter of transistor 33, via corresponding decoupling resistors. Circuit 10 is controlled by switch 11 by means of two diodes 37 and 38 connecting outputs 16 and 17 respectively to the collectors of transistors 34 and 35, respectively.

As previously indicated, circuit 12 and associated switch 13 have configurations identical to those of circuit 10 and associated with switch 11, so that a detailed description thereof is not provided.

Matrix circuit 26 comprises four matching amplifier transistors, T1, T2, T3 and T4 whose bases are respectively supplied with half-parabolic signals 22, 23, 24 and 25. The collectors of transistors T1, T2, T3 and T4 are biased at potential +U while the emitters are grounded via potentiometers P1, P3, P5 and P7, respectively. The sliders of these potentiometers are respectively connected to the base of transistor 32 via resistors R11, R12, R13 and R14 which are the matrix resistors of the line component.

The emitters of transistors T1, T2, T3 and T4 are, in addition, grounded via potentiometers P2, P4, P6 and P8, respectively. The sliders of these potentiometers are respectively connected to the sliders of potentiometers P12, P11, P9 and P10 via decoupling resistors R1, R2, R3 and R4. Potentiometers P9, P10, P11 and P12, which are differential potentiometers, are connected in parallel between the bases of transistors 30 and 31.

Thus, there appears a half-parabolic voltage at line frequency at the slider of potentiometer P2, which corresponds to the setting of the red-green verticals of the right half-side of the picture. At the slider of potentiometer P4, there appears a half-parabolic voltage at line frequency which corresponds to the setting of red-green verticals of the left half-side of the picture. At the slider of potentiometer P6, there appears a half-parabolic voltage at frame frequency which corresponds to the setting of the red-green verticals of the upper half of the picture, and at the slider of potentiometer P8, there appears a half-parabolic voltage at frame frequency which corresponds to the setting of the red-green verticals of the bottom half of the picture.

In the same manner, potentiometer P9 provides the setting of the red-green horizontals of the upper part of the picture while potentiometer P10 provides the setting of the red-green horizontals of the bottom half of the picture. Potentiometer P11 provides the setting of the red-green horizontals of the left half of the picture and potentiometer P12 provides the setting of the red-green horizontals for the right-hand half of the picture.

Thus, there appears at the base of each power transistor 30, 31, and 32, the matrix converted sum of voltage required for the setting of the red, green and blue signals, respectively. In addition, each power transistor collector is connected to a single pair of coils. Moreover, current passing through a potentiometer or resistor has no influence on the adjacent resistor or potentiometer, so that individual settings are substantially independent from one another and therefore the final setting is stable.

The invention is not limited to the above-described embodiment, but, on the contrary, involves any variation thereof, particularly with respect to the embodiments of circuits 10 and 12 which provide half-parabolic signals at line and frame frequencies, embodiments of associated switches 11 and 13, and the embodiments of matrix circuit 26.

Figure 3:
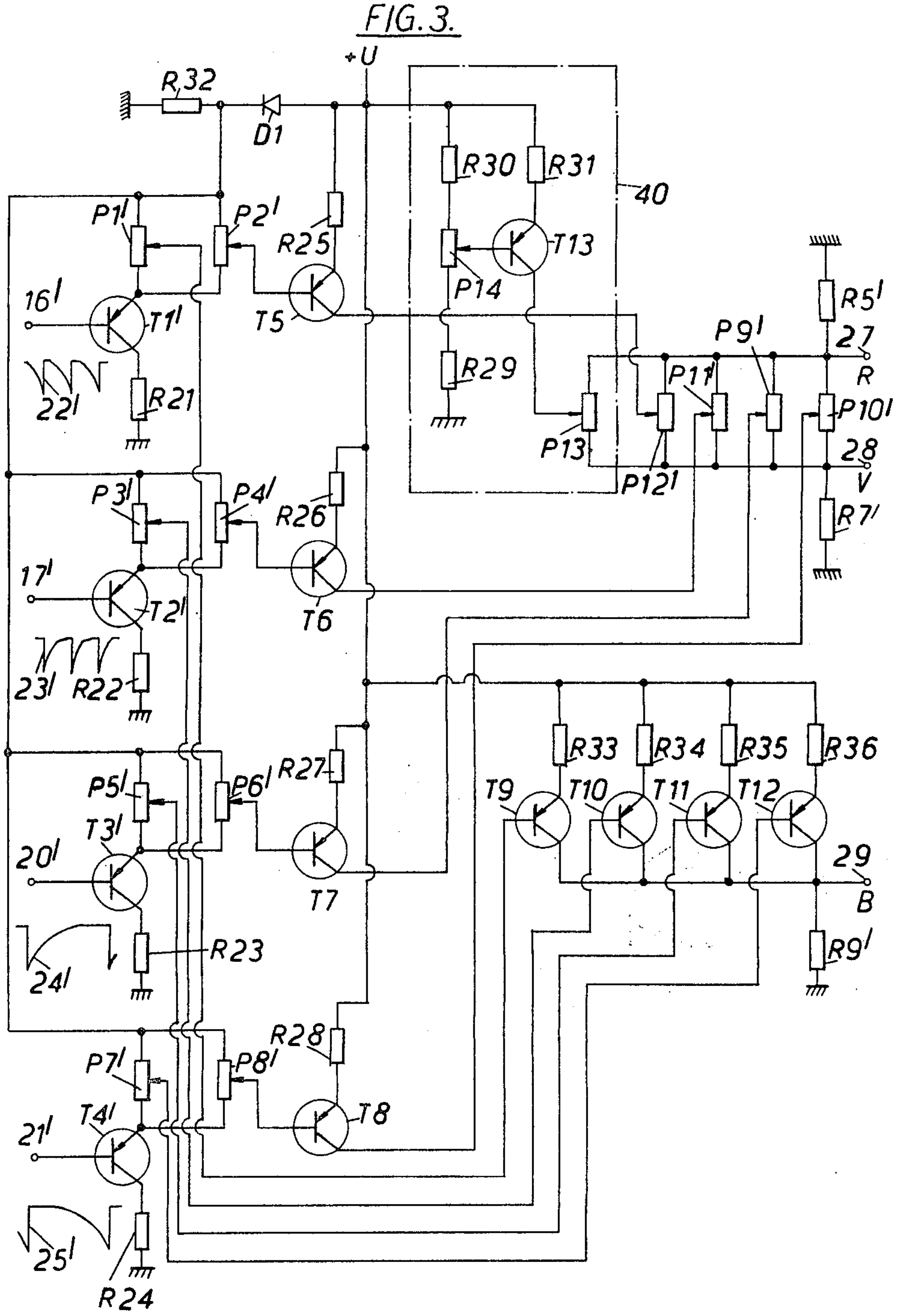
FIG. 3 is a schematic diagram illustrating an alternative embodiment of a portion of the circuit illustrated in FIG. 2.

In this respect, FIG. 3 shows another embodiment of matrix circuit 26 of FIG. 2. In particular, transistors T1', T2', T3', and T4' forming the impedance matching stages, respectively connected to circuits 10 and 12, have the same role as transistors T1, T2, T3 and T4, but are of the PNP type and are supplied with voltage 22', 23', 24', and 25' respectively which are negative with respect to voltages 22, 23, 24 and 25 illustrated in FIG. 2.

Decoupling resistors R1, R2, R3 and R4 of FIG. 2 are respectively replaced by transistors T5, T6, T7 and T8 serving as current amplifier stages. The emitters of these amplifier transistors are respectively biased by resistors R25, R26, R27 and R28 connected to power supply voltage +U.

Matrix resistors R11, R12, R13 and R14 for the blue component in FIG. 2 are replaced respectively by transistors T9, T10, T11 and T12 whose emitters are respectively biased by resistors R33, R34, R35 and R36 which are connected to power supply voltage +U.

Differential potentiometers P9', P10', P11' and P12' are idential to the corresponding differential potentiometers illustrated in FIG. 2. Resistor R5', R7', R9', replacing resistors R5, R7 and R9, are used for biasing bases 27, 28 and 29 of power transistors 30, 31 and 32 (not shown in FIG. 3), which respectively supply the three coil pairs of the red (R), green (V) and blue (B) focusing devices.

In order to further improve the range of the electronic position adjustment of the red and green signals on the color television picture tube, there is provided an additional stage 40. The stage 40 essentially comprises a transistor T13 whose base is connected to the slide contact of potentiometer P14 connected between ground and power supply voltage +U, via resistors R29 and R30. In the same manner, the emitter of transistor T13 is biased by resistor R13 connected to power supply voltage +U.

The collector of transistor T13 is connected to the slide contact of potentiometer P13 which is connected in parallel with differential potentiometers P9', P10', P11' and P12' between terminals 27 and 28. In addition, there is provided a diode connected between power supply voltage +U and potentiometer P2', and resistor R32 permitting the compensation of the base-emitter voltages for transistors T5–T12.

Operation of the matrix circuit of FIG. 3 is identical to that of the matrix circuit of FIG. 2 and no additional description is therefore provided.

Figure 4:
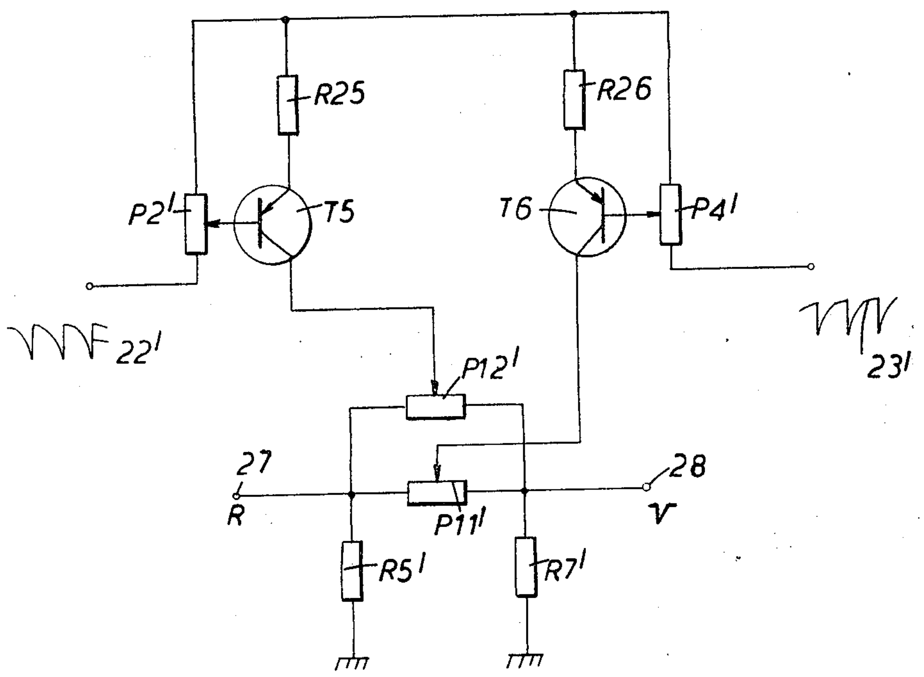
FIG. 4 is a schematic diagram illustrating details of a portion of the circuit illustrated in FIG. 3.

To further explain how the adjustment effected from each of the half-parabolic voltages supplied by circuits 10 and 12 are independent from one another, an example is provided with reference to FIG. 4 which deals with the adjustment obtained from the half-parabolic voltages 22' and 23' applied to the bases of transistors T5 and T6 after impedance matching as provided by transistors T1' and T2'.

The values of resistors R25, R26, P2', P4', P11' and P12' are chosen in the usual manner, to be neigher too low nor too high with respect to the input and output characteristics of transistors T5 and T6. Additionally, the voltage gain factor for each amplifier transistor is set to be within the limits so that the output currents from transistors T5 and T6 are proportional to the half-parabolic voltages 22' and 23' which are respectively applied to potentiometers P2' and P4'.

As a result, the output voltages to terminals 27 and 28 are the sum of two terms whose proportionality coefficients imposed by potentiometers P2' and P4' do not influence each other. In addition, the sum of output voltages appearing at 27 and 28 is constant whatever the position of each slide contact of potentiometers P11' and P12'.

Furthermore, it is possible to show that, two by two, adjustments effected from two half-parabolic voltages at line frequency and from two half-parabolic voltages at frame frequency do not influence one another.

In the embodiments shown in FIGS. 2 and 3 the matrix circuits are constructed of certain combinations of transistors, resistors and potentiometers. Obviously, such a matrix circuit may be built with any other combination of the same components to which other components may be added provided that no mutual reaction depending on frequency is generated between components.

Also, without departing from the scope of this invention, the pair of coils of each focusing device may be supplied by two power transistors, respectively corresponding to half-parabolic signals at line frequency and at frame frequency.

While the principles of the invention have been described in connection with specific structure, it is to be clearly understood that this description is made only by way of example and not as a limitation to the scope of the invention, as set forth in the objects thereof and in the accompanying claims.

I claim:

1. A dynamic horizontal and vertical focusing network for a color television receiver picture tube having red, green, and blue signals applied thereto comprising in combination:

first means coupled to the horizontal deflection circuit of the television receiver for providing first and second half-parabola signals at line frequency;

second means coupled to the vertical deflection circuit of the television receiver for providing third and fourth half-parabola signals at frame frequency;

an adder matrix of active and resistive elements intercoupled to algebraically add said four half-parabola signals to provide first, second, and third focusing signals of different magnitudes, said first, second and third focusing signals each being proportional to the sum of said four half-parabola signals; and first, second, and third focusing electromagnets coupled to said matrix for receiving said first, second, and third focusing signals respectively, for controlling the focus of the red, blue and green signals, respectively.

2. A dynamic horizontal and vertical focusing network, according to claim 1, wherein each of said three focusing signals proportional to said four half-parabola signals are provided by different proportionality factors.

3. A dynamic horizontal and vertical focusing network, according to claim 2, wherein said three focusing electromagnets each include a single pair of focusing coils.

4. A dynamic horizontal and vertical focusing network, according to claim 3, wherein said matrix comprises:

a first impedance matching stage coupled to receive the two half-parabola signals at line frequency;

a second impedance matching stage coupled to receive the two half-parabola signals at frame frequency;

a first amplifier stage coupled to said first impedance matching stage for receiving the output thereof;

a second amplifier stage coupled to said second impedance matching stage for receiving the output thereof;

a first setting stage coupled to said first amplifier stage for receiving the output therefrom and providing the red and green focusing signals; and a second setting stage coupled to said second amplifier stage for receiving the output therefrom and providing the blue focusing signal.

* * * * *

UNITED STATES PATENT OFFICE

CERTIFICATE OF CORRECTION

Patent No. 3,766,429 Dated October 16, 1973

Inventor(s) Jean Gabriel Vincent-Claude Gabriel Jean Thevenin

It is certified that error appears in the above-identified patent and that said Letters Patent are hereby corrected as shown below:

[30] Foreign Application Priority Data
March 12, 1971 France 71 08 664
July 30, 1971 France 71 27 977

Signed and sealed this 2nd day of April 1974.

(SEAL)
Attest:

EDWARD M.FLETCHER,JR.
Attesting Officer

C. MARSHALL DANN
Commissioner of Patents